United States Patent [19]

Clifford

[11] Patent Number: 4,962,785
[45] Date of Patent: Oct. 16, 1990

[54] SAFETY VALVES

[76] Inventor: Walter A. Clifford, 906 Golf View, Tampa, Fla. 33629

[21] Appl. No.: 462,021

[22] Filed: Jan. 8, 1990

Related U.S. Application Data

[63] Continuation-in-part of Ser. No. 322,669, Mar. 13, 1989.

[51] Int. Cl.⁵ .......................... F16K 35/06; F16K 3/02
[52] U.S. Cl. .................................. 137/383; 251/291; 251/327
[58] Field of Search .................. 137/383; 251/90, 291, 251/327; 70/177, 179, 180

[56] References Cited

U.S. PATENT DOCUMENTS

| | | | |
|---|---|---|---|
| 830,411 | 9/1906 | Butchart | 70/180 |
| 1,986,128 | 1/1935 | Trott | 70/177 |
| 2,986,370 | 5/1961 | Girton | 137/383 |
| 3,448,762 | 6/1969 | Schmitt | 137/383 |
| 4,231,389 | 11/1980 | Still et al. | 251/291 |
| 4,257,447 | 3/1981 | Clarkson | 137/375 |
| 4,325,534 | 4/1982 | Roark et al. | 251/291 |

Primary Examiner—John Rivell
Assistant Examiner—L. R. Leo
Attorney, Agent, or Firm—Dominik, Stein, Saccocio, Reese, Colitz & Van Der Wall

[57] ABSTRACT

A gate valve comprising housing walls secured together in face to face relationship, a gate plate reciprocable between an upper open position wherein the gate plate is oriented for allowing the flow of fluid and a lower closed position wherein the gate plate is oriented for precluding the flow of fluid. Locking components are provided and comprise a first arm laterally offset from one housing wall and a second arm laterally offset from the gate plate for movement therewith. Each arm has a hole therethrough, the holes being in alignment when the gate plate is in the lower closed position. A pad lock is positionable through the holes for securing the gate plate against being raised to the upper open position when the gate plate is locked in the lower closed position.

6 Claims, 4 Drawing Sheets

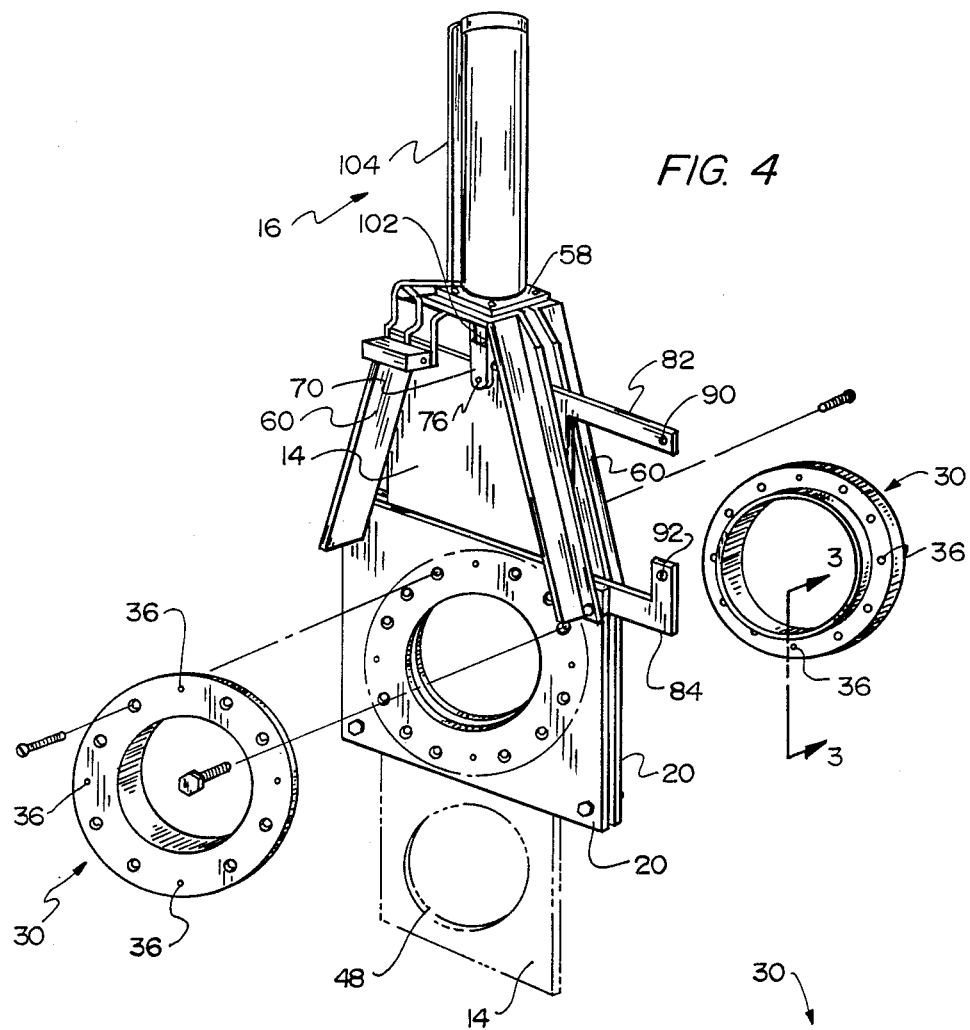
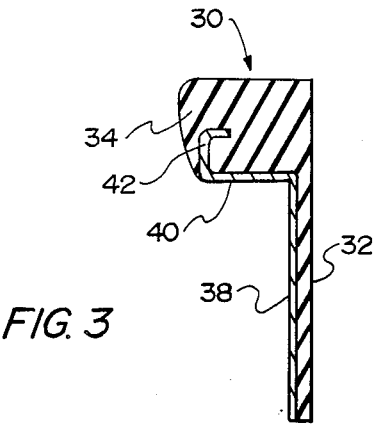

SAFETY VALVES

RELATED PATENT APPLICATION

This application is a continuation-in-part of pending Walter Allen Clifford U.S. Pat. application Ser. No. 07/322,669 filed Mar. 13, 1989.

BACKGROUND OF THE INVENTION

1. Field of the Invention

This invention relates to improved safety valves and, more particularly, to safety gate valves and related mechanisms, on the gate and on the housing, for locking of the gate in the closed position.

2. Description of the Background Art

In the field of fluid handling, it is a common practice to insert a valve between lengths of pipe so that the flow of fluids through the pipes may be selectively interrupted or continued at the control of an operator. One common type of valve is that formed with an apertured housing and a reciprocable plate or gate. Valves of such type are commonly called knife valves or gate valves. The gate is reciprocable into and out of the housing. The housing is coupled to the flanges of aligned pipes through which the conveyed fluid moves. When the gate is retracted out of the housing, the valve is open to allow the flow of fluid through the pipes and housing. When the gate is advanced into the housing, the apertures of the housing are blocked by the gate and the flow of fluid through the pipes and housing is precluded. The housing halves on opposite sides of the gate are secured on their axially exterior faces to the flanges of the pipes. Their interior faces are provided with elastomeric sleeves in tight compressive contact with the gate when closed. Movement of the gate is effected through an automatic or manual actuator thereabove.

One typical knife valve is disclosed in Clarkson U.S. Pat. No. 4,257,447. Such knife valve utilizes a shifting gate to open or close pipes to a flow of fluid. When, however, it is desired to completely and safely terminate the flow of fluid a more complex mechanical line blind must be utilized. Such blinds are disclosed in a large number of prior art patents.

Blinds are presently considered to be the most reliable method to fully shut off a flow of fluid for "man-safety" purposes. In order to shut off or blind a pipe, a complex, expensive mechanical blind fitting or device has to be manually unbolted. Thereafter, jacking screws are applied separating the flanges of the coupled pipes so the blind or blank section of the gate plate can be swiveled between the flanges. The jacking screws are then released and the fitting is bolted back to reseal the coupling. The flow of fluid has to be shut down while this procedure is being accomplished. On large lines this can take two or more mechanics one half of a day, or longer, if the piping is not accurately aligned.

As illustrated by a great number of prior commercial devices as well as patents, efforts are continuously being made in an attempt to improve valves whereby pipes may be shut down more efficiently, conveniently, reliably and economically. None of these previous efforts, however, provides the benefits attendant with the present invention. Additionally, prior valves do not suggest the present inventive combination of component elements arranged and configured as disclosed and claimed herein. The present invention achieves its intended purposes, objectives and advantage over the prior art devices through a new, useful and unobvious combination of component elements, with the use of a minimum number of functioning parts, at a reduced cost to manufacture, and by employing only readily available materials.

In order to assure ultimate convenience and safety, the present invention provides a pad lock, two simple brackets and a quick disconnect gate-stem pin so no one can accidentally operate the valve. The benefits include: (1) One operator, not a mechanic, can operate the blind valve in a matter of minutes; (2) The process does not have to be shut down; (3) The device can operate as a shut off valve during normal operations; and (4) Nothing is ever unbolted so piping misalignment is never a problem.

Therefore, it is an object of this invention to provide an improved safety gate valve comprising housing walls secured together in face to face relationship with an aperture extending through each housing wall in alignment about a central axis and defining a chamber therebetween; a gate plate reciprocable between an upper open position wherein the gate plate is oriented for allowing the flow of fluid through the apertures and the chamber and a lower closed position wherein the gate plate is oriented for precluding the flow of fluid through the apertures; annular sleeves fabricated of an elastomeric material and having sealing projections positioned in operative association with the apertures and extending into the chamber in sealing contact with the gate plate when in the closed position to form a bidirectional seal; locking means comprising a first arm laterally secured to one housing wall and a second arm laterally secured to the gate plate for movement therewith, each arm having a hole therethrough in alignment when the gate plate is in the lower closed position, and with a pad lock positionable through the holes for securing the gate plate against being raised to the upper open position when the gate plate is locked in the lower closed position; an actuator rod movable to reciprocate the gate plate between the upper open and lower closed positions; and a gate stem pin positionable through an opening at the lower end of the actuator rod and an opening at the upper edge of the gate plate whereby movement of the actuator rod will reciprocate the gate plate between the open and closed positions, the gate stem pin being removable from the openings whereby movement of the actuator rod will not reciprocate the gate plate between the open and closed positions, the gate stem pin also including a flexible connector coupling the gate stem pin with respect to the housing walls to preclude misplacing the gate stem pin.

It is a further object of the present invention to rapidly shut off the flow of fluids between pipes in a reliable, convenience and safe manner.

It is a further object of the present invention to terminate the flow of fluids in a line without shutting off the system.

Lastly, it is a further object of the present invention to simplify the blinding of pipes.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be incorporated into an improved gate valve comprising housing walls secured together in face to face relationship with an aperture extending through each housing wall in alignment about a central axis and defining a chamber therebetween; a gate plate reciprocable between an upper open position wherein the gate plate is oriented for allowing the flow of fluid through the apertures and the chamber and a lower closed position wherein the gate plate is oriented for precluding the flow of fluid through the apertures; annular sleeves fabricated of an elastomeric material and having sealing projections positioned in operative association with the apertures and extending into the chamber in sealing contact with the gate plate when in the closed position to form a bidirectional seal; locking means comprising a first arm laterally secured to one housing wall and a second arm laterally secured to the gate plate for movement therewith, each arm having a hole therethrough in alignment when the gate plate is in the lower closed position, and with a pad lock positionable through the holes for securing the gate plate against being raised to the upper open position when the gate plate is locked in the lower closed position; an actuator rod movable to reciprocate the gate plate between the upper open and lower closed positions; and a gate stem pin positionable through an opening at the lower end of the actuator rod and an opening at the upper edge of the gate plate whereby movement of the actuator rod will reciprocate the gate plate between the open and closed positions, the gate stem pin being removable from the openings whereby movement of the actuator rod will not reciprocate the gate plate between the open and closed positions, the gate stem pin also including a flexible connector coupling the gate stem pin with respect to the housing walls to preclude misplacing the gate stem pin.

Further, the invention may be incorporated into a safety gate valve comprising housing walls secured together in face to face relationship with an aperture extending through each housing wall in alignment about a central axis and defining a chamber therebetween; a gate plate reciprocable between an open position wherein the gate plate is oriented for allowing the flow of fluid through the apertures and the chamber and a closed position wherein the gate plate is oriented for precluding the flow of fluid through the apertures; annular sleeves fabricated of an elastomeric material and having sealing projections positioned in operative association with the apertures and extending into the chamber in sealing contact with the gate plate when in the closed position; and locking means for securing the gate plate against movement with respect to the housing walls when in the gate plate is in the closed position.

The locking means comprises a first arm laterally secured to one housing wall and a second arm laterally secured to the gate plate for movement therewith, each arm having a hole therethrough in alignment when the gate plate is in the closed position, and with a pad lock positionable through the holes for securing the gate plate against being moved to the open position when the gate plate is locked in the closed position. The second arm is formed as an extension of the gate plate and is in a common first plane therewith and the second arm is attached to one housing wall with an upwardly extending portion in a plane offset from the first plane whereby the apertures of the arms are positionable in axial alignment when the gate plate is in the closed position. The gate valve further includes an actuator rod movable to reciprocate the gate plate between the open and closed positions. The gate valve further includes a gate stem pin positionable through an opening at the lower end of the actuator rod and an opening at the upper edge of the gate plate whereby movement of the actuator rod will reciprocate the gate plate between the open and closed positions, the gate stem pin being removable from the openings whereby movement of the actuator rod will not reciprocate the gate plate between the open and closed positions, the gate stem pin also including a flexible connector coupling the gate stem pin with respect to the housing walls to preclude misplacing the gate stem pin.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 3 is a sectional view taken through one of the sealing sleeves.

FIG. 4 is an exploded perspective view of an alternate embodiment of the invention with the gate in the open position.

Similar reference characters refer to similar parts throughout the several Figures.

DETAILED DESCRIPTION OF THE INVENTION

Figure 1:
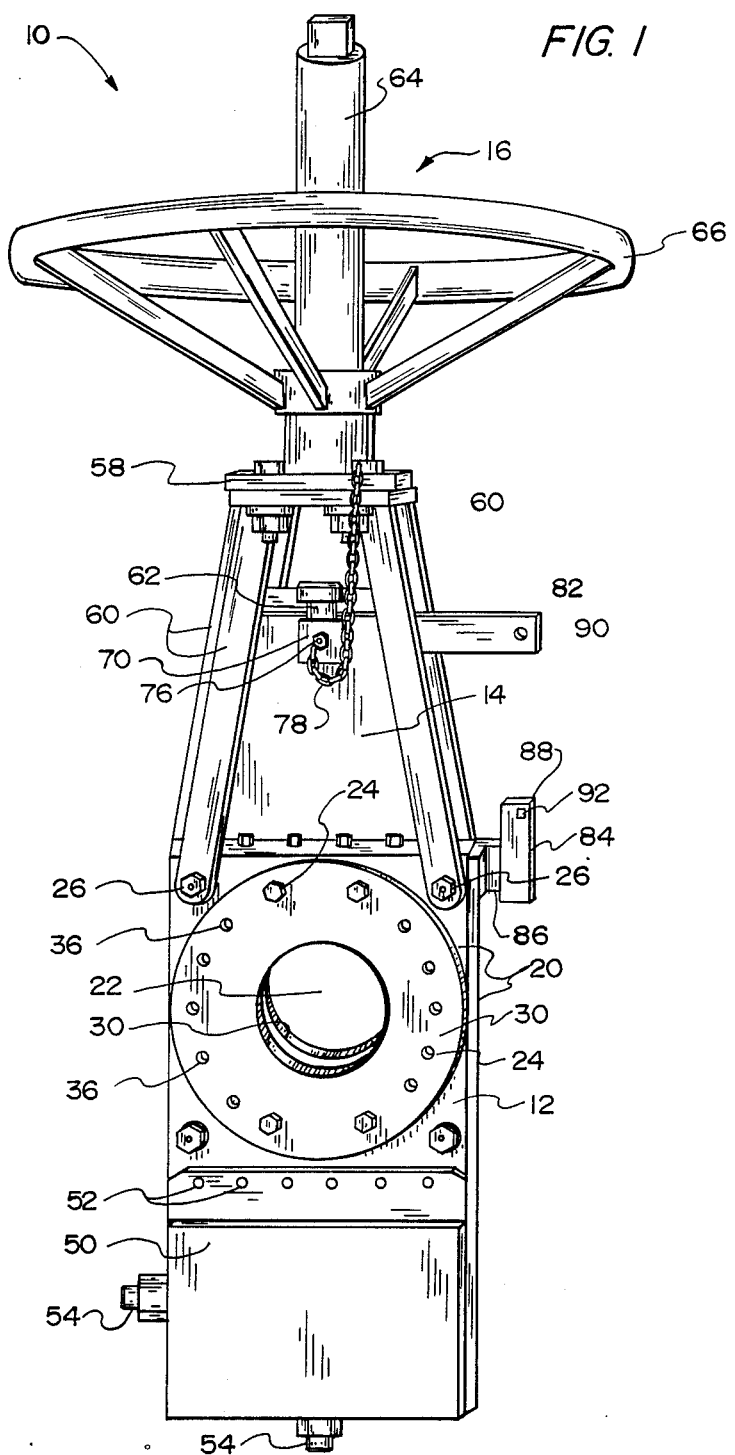
FIG. 1 is a perspective illustrustration of the safety valve of the present invention with the gate in the open position.
Figure 2:
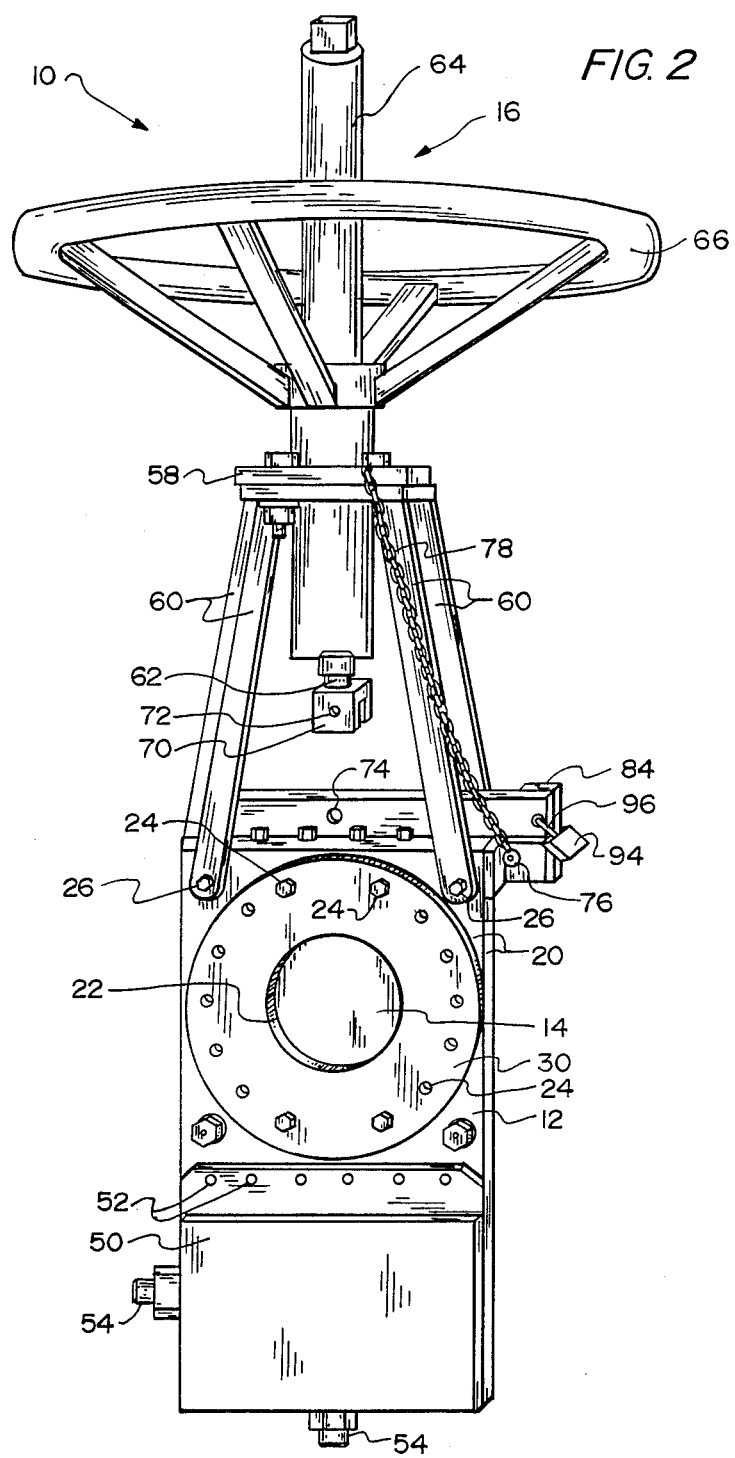
FIG. 2 is a view similar to FIG. 1 but showing the safety valve with the gate in the closed position.
Figure 5:
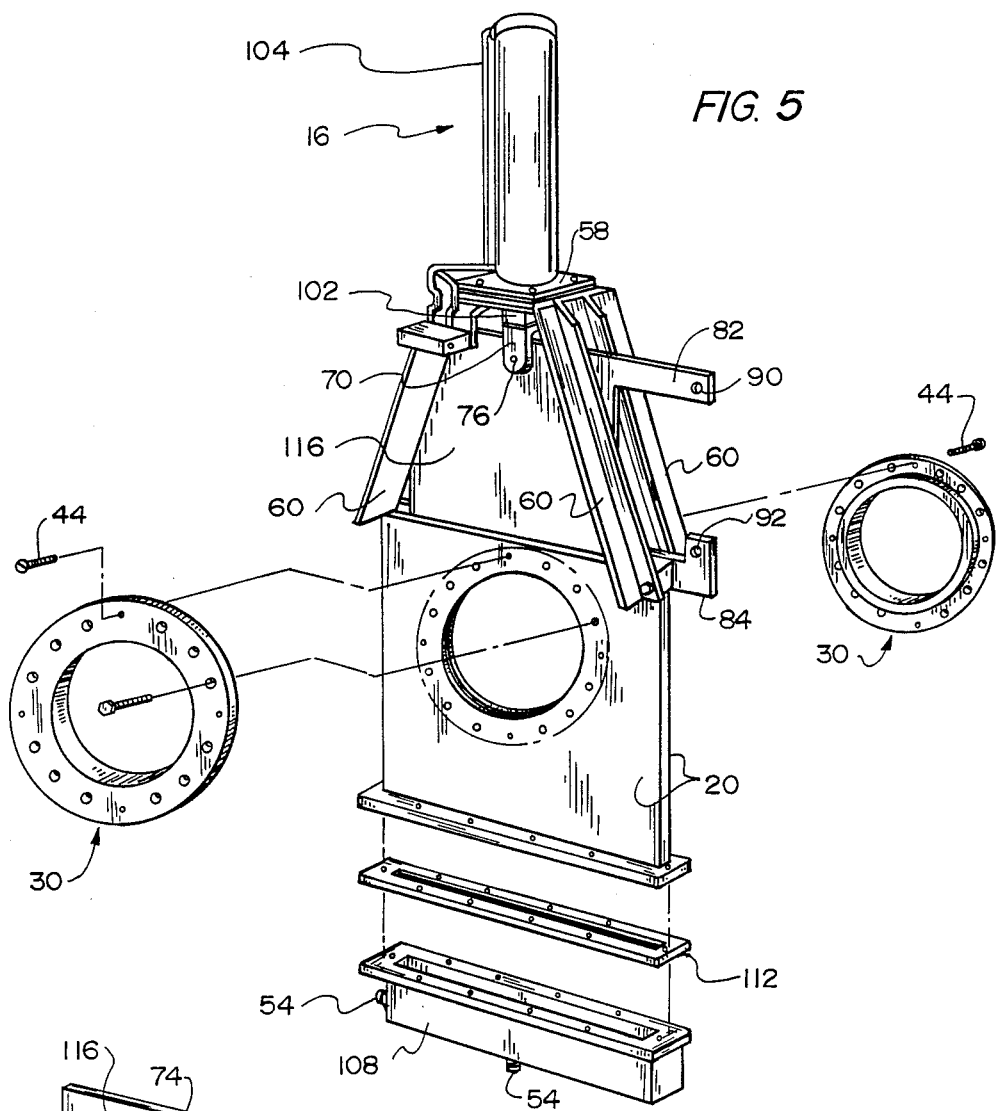
FIG. 5 is an exploded perspective view of yet a further embodiment of the invention.
Figure 6:
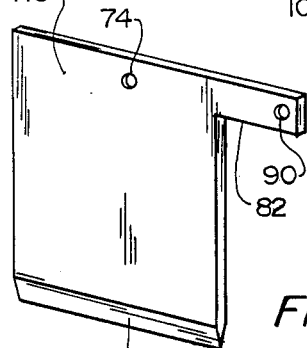
FIG. 6 is an isometric view of the gate plate of the FIG. 5 embodiment.

As can be most clearly seen in FIGS. 1 and 2, the present invention is shown as a gate valve assembly 10 which includes a fixedly positioned housing 12, a gate plate 14 slidable within the housing, and an actuator 16 secured to the housing is operatively coupled to the gate plate. Together, these major components constitute the gate valve which is positionable between adjacent flanged pipes, not shown, or the like for allowing the flow of fluids through the pipes or for precluding the flow of fluids therethrough.

The ends of the pipes to be coupled to the housing are adapted to be secured thereto as by cap screws or the like. The pipes at their adjacent portions are formed with flanges with spaced holes symmetrically arranged in a conventional circular orientation for receiving the cap screws whereby the pipes may be coupled and uncoupled to the gate valve as may be desired. Since the pipes are generally stationary during operation and use, they couple with the housing which is also stationary during operation and use.

The housing is formed of spaced parallel housing walls 20 of similar configuration. Each wall is generally rectangular and is provided with a central aperture 22 for the flow of fluids therethrough. The walls are formed with threaded apertures in lower portions. The walls are preferably fabricated by casting as a single unit to constitute the upper housing assembly. Also formed in each plate are radially exterior threaded holes 24 in a conventional circular pattern corresponding in location to the apertures of the flanges of the pipes to be coupled thereto. Unthreaded holes are provided in the upper two corners of the housing walls for the passage of long corner bolts 26 therethrough with nuts to provide an arrangement for coupling the valve to its the actuator.

Also part of the housing are a pair of similarly shaped annular sealing sleeves 30. The sleeves 30 are formed with a first part fabricated of an elastomeric material. Each first part includes a washer-like portion 32 on its axially exterior extents. Each first part also includes an axially extending interior seal portion 34 having an exterior diameter of a size to be received in, and effectively line, the aperture of a housing. The flat exterior washer-like portion of the first part of each sleeve is adapted to be positioned over the exterior face of its associated housing wall adjacent to its aperture. The washer-like portion extends radially outwardly form the housing wall aperture and is provided with holes 36 located to correspond to the threaded holes of the housing walls and the flanges of the pipes to be coupled thereto. These washer-like portions 34 function as gaskets between the housing walls and their associated pipes.

The second portion of each sleeve is the interior sealing projection which is formed integrally with the washer-like portion. Associated sealing projections extend inwardly into the chamber between the walls and are of a length greater than the thickness of the housing walls. Associated sealing projections are correlated with the thickness of the spacers and housing walls so that when the housing walls are coupled with the sealing projections they will form an annular space with the adjacent ends of the sealing projections separated a distance slightly less than the thickness of the gate plate. The facing free ends of the sealing projections have rounded edges extending therefrom. The distance between the facing free ends is between about 20 to 40 percent of the thickness of the gate plate when measured prior to the gate plate being positioned between the sealing projections. For example, when 12 inch diameter pipes are coupled with a 12 inch diameter gate valve, a gate plate with a thickness of 0.375 inches would be utilized. An interference of 0.125 inches between the sealing projections and the gate plate would provide a desired sealing relationship. Larger or smaller diameter pipes and gate valves could, of course be utilized, with larger or smaller gate plaes along with appropriate intereference between the sealing projections and the gate plates.

Each sealing sleeve is effectively a one-piece unitive member for reduction of cost and ease of repair of the gate valve. In addition to the elastomeric first part as described above, an additional or second part is also preferably utilized. This second part is the rigid, preferably metallic, stiffening ring 38. Note FIG. 3 for a sectional view through a sealing sleeve. The stiffening ring is a member fabricated into the elastomeric first part to add rigidity and life to the sealing sleeve. It includes an annular flat L-shaped segment 40 adhered to the radially interior face of the first part and a J-shaped segment 42 extending axially interiorly therefrom. Tgoether they form an L-J ring. The longer leg of the J-shaped segment is adhered to the radially exterior edge of the sealing projection while the remaining curved segment is molded into the sealing projection. In this manner, the gate plate may be slid against the opposed interior faces of the sealing projections which are sufficiently resilient to effect a water and air bubble tight seal when the gate plate is in the closed position. Strength is provided to the elastomeric first part of the sealing sleeve by virtue of the rigid, metallic, L-J stiffening ring. The composite sealing sleeve is effectively a one piece member for convenience during repair or reconstruction, eliminating all metal to metal sliding contacts.

Short cap screws 44 extend through threaded holes in the sleeves at symmetrically spaced locations for being threadedly received in the threaded holes in the housing walls through holes in the sleeve. These short cap screws with their associated threaded holes will position the sealing sleeves in proper position on the housing walls prior to the coupling of the pipes thereto. The holes in the sleeve, having been positioned by the short cap screws, will be oriented to align with the holes of the housing walls as well as the holes of the flanges of the pipes so that when cap screws are positioned through the holes of the flanges of the pipes to be coupled and the holes of the sleeves, they may be threadedly received in the threaded holes of the housing plates.

The gate plate 14 is an apertured rectangular piece of strong, corrosion resistant material such as stainless steel with an aperture at its upper edge. The gate plate is located within the chamber in sliding contact with the free faces of the sealing projections 34. It is reciprocable from an upper or retracted position wherein its aperture is aligned with the aperture of the sealing projections. Note FIG. 1. The gate plate is also reciprocable to a lower or advanced position wherein the unapertured portion of the gate plate is positioned to block the flow of fluid through the pipes and the gate valve. Note FIG. 2.

Located beneath the housing walls is an extender member 50. The extender member is a component having apertures at its upper end adapted to be coupled to the lower end of the housing walls by bolts 52. It constitutes a chamber for receiving the lower portion of the gate when in the lower or closed position as shown in FIG. 2. The chamber is empty when the gate is in the upper position of FIG. 1. The extender member simply functions to seal the valve at its lower end so that fluids which might escape from the line between the sleeves and gate will not inadvertently flow from the valve to therebeneath. Ports or orifices 54 are provided at a lower and side edge for the removal of fluids or for backwashing of the system. Greater detail with regard to this feature of the invention may be had by reference to parent application Ser. No. 07/322,669 referred to hereinabove. In addition, reference is had to my prior patent, U.S. Pat. No. 4,765,361 issued Aug. 23, 1988, for a more detailed description of the other features of the present invention. The subject matter of my prior patent is incorporated by reference herein.

The actuator 16 is located above the housing and gate plate. This actuator has an intermediate horizontal plate 58 with four depending sections of angle iron 60. The sections of angle iron are fixedly positioned at their lower ends to the upper elongated corner bolts 26 of the housing. The upper portions of the angle iron are bolted to the underside of the horizontal support plate in a conventional manner.

The actuator of the primary embodiment of my invention includes a rod 62 reciprocable vertically between an upper position as shown in FIG. 1 and a lower position as shown in FIG. 2. The rod is mounted for movement within a fixed vertical tube 64. Also located on the vertical tube for rotational movement is a hand wheel 66. The hand wheel 66 has a central threaded aperture in threaded engagement with the threads of the reciprocable rod. Rotation of the hand wheel in one direction or the other will thus act to raise or lower the rod. The lower end of the reciprocable rod is provided with a clevis 70 having an aperture 72 adapted to be aligned with an aperture 74 at the upper edge of the gate for effecting their coupling and concurrent movement through a gate stem pin 76. For the sake of convenience, one end of the gate stem pin is coupled to a flexible coupling 78 such as a chain, the other end of the chain is secured by welding or a bolt to a frame portion of the valve.

In the primary embodiment of the invention, as in the subsequent embodiments, the interface between the seals and the faces of the gate plate make a good seal to preclude leakage in both directions. This constitutes a bi-directional valve. When the gate is in the elevated position, the seal edges are in contact with the gate around its aperture to allow the flow of fluid along the pipes in its intended direction of flow. The seals and gate thus make the primary seal for the fluid while the periphery of the housing walls constitute a peripheral secondary seal.

In addition to the foregoing, the invention also includes extensions or arms 82 and 84 located in association with the gate and one of the fixed elements of the valve, such as one housing wall as shown. Each of the arms is formed with an aperture which is adapted to be aligned when the gate is in the closed position. One arm 82 is formed as an extension of the gate plate and is in a common first plane therewith. The other arm 84 is attached to one housing wall with an outwardly extending portion 86 and an upwardly extending portion 88 in a plane offset from the first plane. The apertures of 90 and 92 of the arms 82 and 84 are positionable in axial alignment when the gate plate is in the closed position. When in the closed position, a pad lock 94 may be employed with its U-shaped locking member or shackle 96 extending through the apertures of the two arms. This functions to preclude inadvertent lifting of the gate from the closed position. In addition, when in the closed position, the gate stem pin 76 which couples the actuator rod 62 and the top of the gate 14 is preferably removed so that inadvertent movement of the controls will not generate a force tending to raise the gate and do damage to the lock and/or valve. In order to open the gate, the pad lock is removed, the gate pin is inserted through a clevis and gate, and the gate is then lifted in the normal fashion.

In accordance with the second embodiment of the invention, shown in FIG. 4, the housing walls are not totally sealed peripherally. As in the primary embodiment, operation is effected by an apertured gate 14 having an imperforate upper section to close off the valve and an aperture 48 in the lower section for allowing flow of fluid therethrough. As in the primary embodiment, this embodiment includes similar housing halves or walls 20, sealing sleeves 30 and actuator mechanism 16. A portion of the gate is always between the seals independent of orientation. The lower edge of the housing, however, is open to accommodate the movement of the gate to the closed position. The locking mechanisms including arms 82 and 84 with apertures 90 and 92 are the same in structure and function as the first embodiment.

This second embodiment of the invention adds a further feature not found in the primary invention by having the lower edge of the housing open, any deteriorating seals which would leak would leak to atmosphere and fall to the ground rather than being entrapped within the sealed housing walls. Such sealed housing halves of the primary embodiment would function to force fluid leakage from the input pipe to the output pipe so that a limited quantity of undesirable fluid might flow from the input pipe to the output pipe by flowing around the gate.

In addition, this second embodiment is operated by an automatic cylinder 98. Controls might be at the site or at a remote location. Mounted to the horizontal plate 58 and extending upwardly therefrom is the actuator cylinder 98 supporting an axially reciprocable actuator rod 102. The rod has a piston, not shown, at its upper end reciprocable within the cylinder between the lower advanced position and the upper retracted position. An actuator line 104 is coupled with conventional control mechanisms to drive, pneumatically or hydraulically, the piston and, consequently, the actuator rod between the upper open position and the lower closed position all in the conventional manner. The lower end of the actuator rod is releasably coupled to the upper end of the gate plate through a releasable pin 76 for movement of the gate plate 14 concurrently with the movement of the actuator rod 102. In this manner, the movement of the gate plate is effected by an operator, on site or from a remote location, to move the gate plate between an upper position where fluid may flow through the pipes and gate valve and a closed position precluding the flow of fluid therethrough. Movement of the gate plate and its control may also be done manually. It is this remote location situation which results in the most inadvertent attempts to open the gate when locked in a closed position.

The third embodiment of the invention is similar to the second except that the lower portion of the housing is sealed through a short removable extender member 108 and gasket 112 through bolts in the conventional manner for accommodating the movement of the lower apertured section of the elongated gate. This embodiment also includes the housing halves or walls 20 sealed around vertical edges and top edge in combination with the seals and gate. In this third or last embodiment of the invention, the gate is imperforate and short and is formed with a lower knife edge 118. The knife edge is such that when the gate is moved from its upper operative position to the lower closed position, the gate can move smoothly. When in the lower closed position, the gate shuts off the flow of fluid as in the prior embodiments. When, however, the gate is in the raised position, the flow of fluid will occur and the seals around the housing walls constitute the primary seals for the valve. The short extender member 108 is located beneath the housing walls and also functions as a seal. The lower extension has at least one relief opening 120 for allowing the removal of fluids from the housing. The lower opening may be opened or closed to allow fluid flow to the atmosphere by dropping to the ground. In the alternative, it might be closed for functioning as a secondary seal as in the primary embodiment. As in the first three embodiments, the device includes facing housing walls and seals and a gate operated by an automatic cylinder. The locking mechanisms including arms 82 and 84 has apertures 90 and 92 for functioning with a pad lock as in the first two embodiments.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described, what is claimed is:

1. A gate valve comprising:
   housing walls secured together in face to face relationship with an aperture extending through each housing wall in alignment about a central axis and defining a chamber therebetween;
   a gate plate reciprocable between an upper open position wherein the gate plate is oriented for allowing the flow of fluid through the apertures and the chamber and a lower closed position wherein the gate plate is oriented for precluding the flow of fluid through the apertures;
   annular sleeves fabricated of an elastomeric material and having sealing projections positioned in operative association with the apertures and extending into the chamber in sealing contact with the gate plate when in the closed position to form a bidirectional seal;
   locking means comprising a first arm laterally secured to one housing wall and a second arm laterally secured to the gate plate for movement therewith, each arm having a hole therethrough in alignment when the gate plate is in the lower closed position, and with a pad lock positionable through the holes for securing the gate plate against being raised to the upper open position when the gate plate is locked in the lower closed position;
   an actuator rod movable to reciprocate the gate plate between the upper open and lower closed positions; and
   a gate stem pin positionable through an opening at the lower end of the actuator rod and an opening at the upper edge of the gate plate whereby movement of the actuator rod will reciprocate the gate plate between the open and closed positions, the gate stem pin being removable from the openings whereby movement of the actuator rod will not reciprocate the gate plate between the open and closed positions, the gate stem pin also including a flexible connector coupling the gate stem pin with respect to the housing walls to preclude misplacing the gate stem pin.

2. A gate valve comprising:
   housing walls secured together in face to face relationship with an aperture extending through each housing wall in alignment about a central axis and defining a chamber therebetween;
   a gate plate reciprocable along an axis between an open position wherein the gate plate is oriented for allowing the flow of fluid through the apertures and the chamber and a closed position wherein the gate plate is oriented for precluding the flow of fluid through the apertures;
   annular sleeves fabricated of an elastomeric material and having sealing projections positioned in operative association with the apertures and extending into the chamber in sealing contact with the gate plate when in the closed position; and
   locking means extending from the gate plate and housing walls, laterally of said axis for securing the gate plate against movement with respect to the housing walls when in the gate plate is in the closed position.

3. The gate valve as set forth in claim 2 wherein the locking means comprises a first arm laterally secured to one housing wall and a second arm laterally secured to the gate plate for movement therewith, each arm having a hole therethrough in alignment when the gate plate is in the closed position, and with a pad lock positionable through the holes for securing the gate plate against being moved to the open position when the gate plate is locked in the closed position.

4. The gate valve as set forth in claim 3 wherein the second arm is formed as an extension of the gate plate and is in a common first plane therewith and the second arm is attached to one housing wall with an upwardly extending portion in a plane offset from the first plane whereby the apertures of the arms are positionable in axial alignment when the gate plate is in the closed position.

5. The gate valve as set forth in claim 4 and further including an actuator rod movable to reciprocate the gate plate between the open and closed positions.

6. The gate valve as set forth in claim 5 and further including a gate stem pin positionable through an opening at the lower end of the actuator rod and an opening at the upper edge of the gate plate whereby movement of the actuator rod will reciprocate the gate plate between the open and closed positions, the gate stem pin being removable from the openings whereby movement of the actuator rod will not reciprocate the gate plate between the open and closed positions, the gate stem pin also including a flexible connector coupling the gate stem pin with respect to the housing walls to preclude misplacing the gate stem pin.

* * * * *